(12) United States Patent
Seo et al.

(10) Patent No.: US 9,342,177 B2
(45) Date of Patent: May 17, 2016

(54) DISPLAY DEVICE WITH INTEGRATED TOUCH SCREEN HAVING DUMMY ELECTRODES

(71) Applicant: LG Display Co., Ltd., Seoul (KR)

(72) Inventors: Seong-Mo Seo, Gyeonggi-do (KR); Tae-Hwan Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 112 days.

(21) Appl. No.: 14/138,334

(22) Filed: Dec. 23, 2013

(65) Prior Publication Data

US 2015/0084912 A1    Mar. 26, 2015

(30) Foreign Application Priority Data

Sep. 25, 2013  (KR) ........................ 10-2013-0113784

(51) Int. Cl.
    *G06F 3/044*  (2006.01)
    *G06F 3/041*  (2006.01)
    *G02F 1/1333* (2006.01)

(52) U.S. Cl.
    CPC .......... *G06F 3/0412* (2013.01); *G02F 1/13338* (2013.01); *G06F 3/044* (2013.01); *G06F 2203/04107* (2013.01)

(58) Field of Classification Search
    CPC ... G06F 3/0412; G06F 3/044; G02F 1/13338; G02F 1/1362; G06G 2203/04107
    See application file for complete search history.

(56) References Cited

U.S. PATENT DOCUMENTS

| 9,030,431 | B2 * | 5/2015 | Mizuhashi et al. | 345/173 |
| 2010/0220071 | A1 * | 9/2010 | Nishihara | G06F 3/0416 345/173 |
| 2010/0328257 | A1 | 12/2010 | Noguchi et al. | |
| 2011/0018560 | A1 * | 1/2011 | Kurashima | 324/679 |
| 2011/0057893 | A1 * | 3/2011 | Kim et al. | 345/173 |
| 2011/0080376 | A1 * | 4/2011 | Kuo | G06F 3/0412 345/177 |
| 2011/0102360 | A1 * | 5/2011 | Chen et al. | 345/173 |
| 2011/0291961 | A1 * | 12/2011 | Hsieh | G06F 3/044 345/173 |

(Continued)

FOREIGN PATENT DOCUMENTS

| JP | 11-154053 A | 6/1999 |
| JP | 2011-008724 A | 1/2011 |

(Continued)

OTHER PUBLICATIONS

Office Action dated Mar. 3, 2015 for corresponding Japanese Patent Application No. 2013-255820.

(Continued)

*Primary Examiner* — Dwayne Bost
*Assistant Examiner* — Darlene M Ritchie
(74) *Attorney, Agent, or Firm* — Morgan, Lewis & Bockius LLP

(57) ABSTRACT

A display device with an integrated touch screen includes a panel divided into a display area and a non-display area and including m (m is a natural number) driving electrodes, m signal lines and dummy electrodes; a display driver IC applying a common voltage or a touch scan signal to the m driving electrodes through the m signal lines; and a touch IC generating the touch scan signal and providing the touch scan signal to the display driver IC, wherein the m driving electrodes are disposed in the display area and the dummy electrodes are disposed in the non-display area, and wherein the dummy electrodes are adjacent to the driving electrodes in a peripheral region of the display area.

16 Claims, 7 Drawing Sheets

(56) References Cited

U.S. PATENT DOCUMENTS

| | | | |
|---|---|---|---|
| 2012/0044203 A1* | 2/2012 | Ishizaki | G06F 3/0412 345/174 |
| 2012/0105366 A1* | 5/2012 | Lai et al. | 345/174 |
| 2012/0268418 A1* | 10/2012 | Ishizaki | G06F 3/0412 345/174 |
| 2012/0313881 A1* | 12/2012 | Ge et al. | 345/174 |
| 2013/0016065 A1* | 1/2013 | Reynolds | G06F 3/0412 345/174 |
| 2013/0093706 A1* | 4/2013 | Kurasawa et al. | 345/173 |
| 2013/0147724 A1* | 6/2013 | Hwang et al. | 345/173 |
| 2013/0181923 A1* | 7/2013 | Chen et al. | 345/173 |
| 2013/0188104 A1 | 7/2013 | Aoki et al. | |
| 2013/0285971 A1* | 10/2013 | Elias | G06F 3/044 345/174 |
| 2014/0028582 A1* | 1/2014 | Choi | G06F 3/041 345/173 |
| 2014/0176465 A1* | 6/2014 | Ma | G06F 3/041 345/173 |
| 2014/0184951 A1* | 7/2014 | Yeh | G06F 3/044 349/12 |
| 2014/0198066 A1* | 7/2014 | Yoshida | G06F 3/044 345/173 |
| 2014/0375605 A1* | 12/2014 | Ootani | 345/174 |
| 2015/0002458 A1* | 1/2015 | Lee | G06F 3/045 345/174 |
| 2015/0022500 A1* | 1/2015 | Kita et al. | 345/174 |
| 2015/0116261 A1* | 4/2015 | Ahn | G06F 3/0418 345/174 |
| 2015/0205170 A1* | 7/2015 | Tanaka | G06F 3/0412 349/12 |

FOREIGN PATENT DOCUMENTS

| | | |
|---|---|---|
| JP | 2011-028535 A | 2/2011 |
| JP | 2013-058262 A | 3/2013 |
| JP | 2013-080425 A | 5/2013 |
| JP | 2013-122752 A | 6/2013 |
| KR | 10-2011-0025375 A | 3/2011 |
| KR | 10-2012-0079748 A | 7/2012 |
| KR | 10-2013-0040704 A | 4/2013 |
| KR | 10-2013-0099525 A | 9/2013 |
| TW | M419158 U1 | 12/2011 |
| TW | 201218055 A1 | 5/2012 |
| TW | 201241693 A1 | 10/2012 |
| TW | 201331671 A1 | 8/2013 |
| WO | 2013/129742 A1 | 9/2013 |

OTHER PUBLICATIONS

Office Action dated Apr. 28, 2014 from the German Patent and Trademark Office in German counterpart application No. 102013114174.9.

G. Walker, et al., frontline technology—LCD In-Cell Touch, SID Information Display, Ed. Mar. 2010, 2010, pp. 8-14.

Taiwan Office Action dated May 8, 2015 for corresponding application No. 10420596850.

Korean Office Action issued in Korean Patent Application No. 10-2013-0113784 on Oct. 27, 2015.

* cited by examiner

DISPLAY DEVICE WITH INTEGRATED TOUCH SCREEN HAVING DUMMY ELECTRODES

The present application claims the priority benefit of Korean Patent Application No. 10-2013-0113784 filed in the Republic of Korea on Sep. 25, 2013, which is hereby incorporated by reference in their entirety.

BACKGROUND

1. Field of the Disclosure

The present disclosure relates to a display device, and more particularly, to a display device with an integrated touch screen.

2. Discussion of the Related Art

A touch screen is a kind of input device that is installed in an image display device, such as a liquid crystal display (LCD), a field emission display (FED), a plasma display panel (PDP), an electroluminescence device (EL), an eletrophoretic display (EPD), etc., to allow a user to input predetermined information by pressing (or touching) a touch sensor in the touch screen while viewing the image display device.

Touch screens are classified into an add-on type, an on-cell type and an in-cell type depending on a structure of a touch screen installed in a display device. An add-on type touch screen is manufactured separately from a display device and is attached on an upper substrate of the display device. An on-cell type touch screen comprises elements directly formed on an upper substrate of a display device. An in-cell type touch screen is built in a display device such that the display device has a thin thickness and improved durability.

However, a display device with an add-on type touch screen has disadvantages of thick thickness and low visibility from low brightness. Although it has a thinner thickness than the display device with an add-on type touch screen, a display device with an on-cell type touch screen has disadvantages of increased total thickness, manufacturing processes and manufacturing costs because of driving electrodes, sensing electrodes, and an insulating therebetween for the touch screen.

On the other hand, a display device with an in-cell type touch screen, which may be referred to as a display device with an integrated touch screen, is able to improve durability and to have a thin thickness, thereby solving the problems of the display device with an add-on type touch screen and the display device with an on-cell type touch screen. The display device with an in-cell type touch screen may be classified into optical type and capacitive type. The capacitive type may be subdivided into self capacitance type and mutual capacitive type.

A display device with a mutual capacitance in-cell type touch screen includes a common electrode divided into driving electrodes and sensing electrodes such that mutual capacitance is generated between the driving electrodes and the sensing electrodes and measures a change in the mutual capacitance due to a touch of a user, thereby detecting the touch. A display device with a self capacitance in-cell type touch screen includes a common electrode divided into a plurality of parts such that the plurality of parts are used as touch electrodes and capacitance is generated between the touch electrodes and an input of a user, and a change in the capacitance due to a touch of the user is measured, thereby detecting the touch.

The display device with a self capacitance in-cell type touch screen will be described in detail with reference to FIG. 1.

FIG. 1 is a view of a display device with a self capacitance in-cell type touch screen according to the related art.

In FIG. 1, the display device with a self capacitance in-cell type touch screen of the related art includes a panel 10, a display driver IC (integrated circuit) 20, and a touch IC 30. The panel 10 includes m driving electrodes 13 and m signal lines 14 and is divided into a display area 11 and a non-display area 12. The display driver IC 20 applies a common voltage or a touch scan signal to the m driving electrodes 13 through the m signal lines 14. The touch IC 30 generates the touch scan signal to provide the display driver IC 20 with the touch scan signal and receives touch sensing signals according to the provided touch scan signal to detect a location of a touch input of a user. Here, the m driving electrodes 13 are formed in the display area 11.

In the self capacitance type touch screen of the related art, touch sensitivity varies depending on an area of the electrodes contacting the touch input of the user. Namely, the touch sensitivity is proportional to the area of the electrodes contacting the touch input.

Therefore, the touch sensitivity in a peripheral region of the display area 11 is lower than the touch sensitivity in an inner region of the display area 11, which is surrounded by the peripheral region of the display area 11.

In the self capacitance type touch screen of the related art, the location of the touch input is detected by calculating signals (change in the capacitance) generated between the touch input of the user and the electrodes using algorithm. The larger the area of the electrodes contacting the touch input is, the more the signals (change in the capacitance) are. If algorithm calculation for detecting the location of the touch input is made using more signals, relatively high touch sensitivity may be obtained.

By the way, when there is a touch input in the peripheral region of the display area 11, a part of the touch input may exist in the non-display area 12. For example, when a single touch input contacts or overlaps a boundary between the display area 11 and the non-display area 12, the touch input exists in both the display area 11 and the non-display area 12.

However, since electrodes are not formed in the non-display area 12, the signals according to the touch input cannot be generated in the non-display area 12, and signals for the algorithm calculation are insufficient. Therefore, the touch sensitivity when the touch input exists in the peripheral region of the display area 11 is lower than the touch sensitivity when the touch input exists in the inner region of the display area 11.

For instance, when an touch input is applied to a region "a" or applied to a region "b," average touch sensitivity may be obtained because the touch input exists in the display area 11, and when an touch input is applied to a region "c" or a region "d," touch sensitivity lower than the touch sensitivity in the region "a" or the region "b" may be obtained because the touch input exists in the display area 11 and the non-display area 12, where the electrodes for generating signals according to the touch input are not formed.

More particularly, the touch sensitivity in the region "c" is lower than the touch sensitivity in the region "a" and the region "b," and the touch sensitivity in the region "d" is lower than the touch sensitivity in the region "c." This is why the touch sensitivity is proportional to the area of the electrodes contacting the touch input.

In the self capacitance type touch screen of the related art, a solution to solve the low touch sensitivity in the peripheral region of the non-display area 11 has been sought for.

SUMMARY OF THE INVENTION

Accordingly, the present invention is directed to a display device with an integrated touch screen, which substantially obviates one or more of the problems due to limitations and disadvantages of the related art.

An object of the present disclosure is to provide a display device with an integrated touch screen that improves touch sensitivity and ability in a peripheral region of a display area.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, there is provided a display device with an integrated touch screen includes a panel divided into a display area and a non-display area and including m (m is a natural number) driving electrodes, m signal lines and dummy electrodes; a display driver IC applying a common voltage or a touch scan signal to the m driving electrodes through the m signal lines; and a touch IC generating the touch scan signal and providing the touch scan signal to the display driver IC, wherein the m driving electrodes are disposed in the display area and the dummy electrodes are disposed in the non-display area, and wherein the dummy electrodes are adjacent to the driving electrodes in a peripheral region of the display area.

In another aspect, a display device with an integrated touch screen includes a panel divided into a display area and a non-display area and including m (m is a natural number) driving electrodes, m signal lines and dummy electrodes; and a touch IC applying a touch scan signal to the m driving electrodes through the m signal lines and receiving touch sensing signals according to the touch scan signal from the m driving electrodes to detect a location of a touch input on the panel, wherein the m driving electrodes are disposed in the display area and the dummy electrodes are disposed in the non-display area, and wherein the dummy electrodes are adjacent to the driving electrodes in a peripheral region of the display area.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Figure 1:
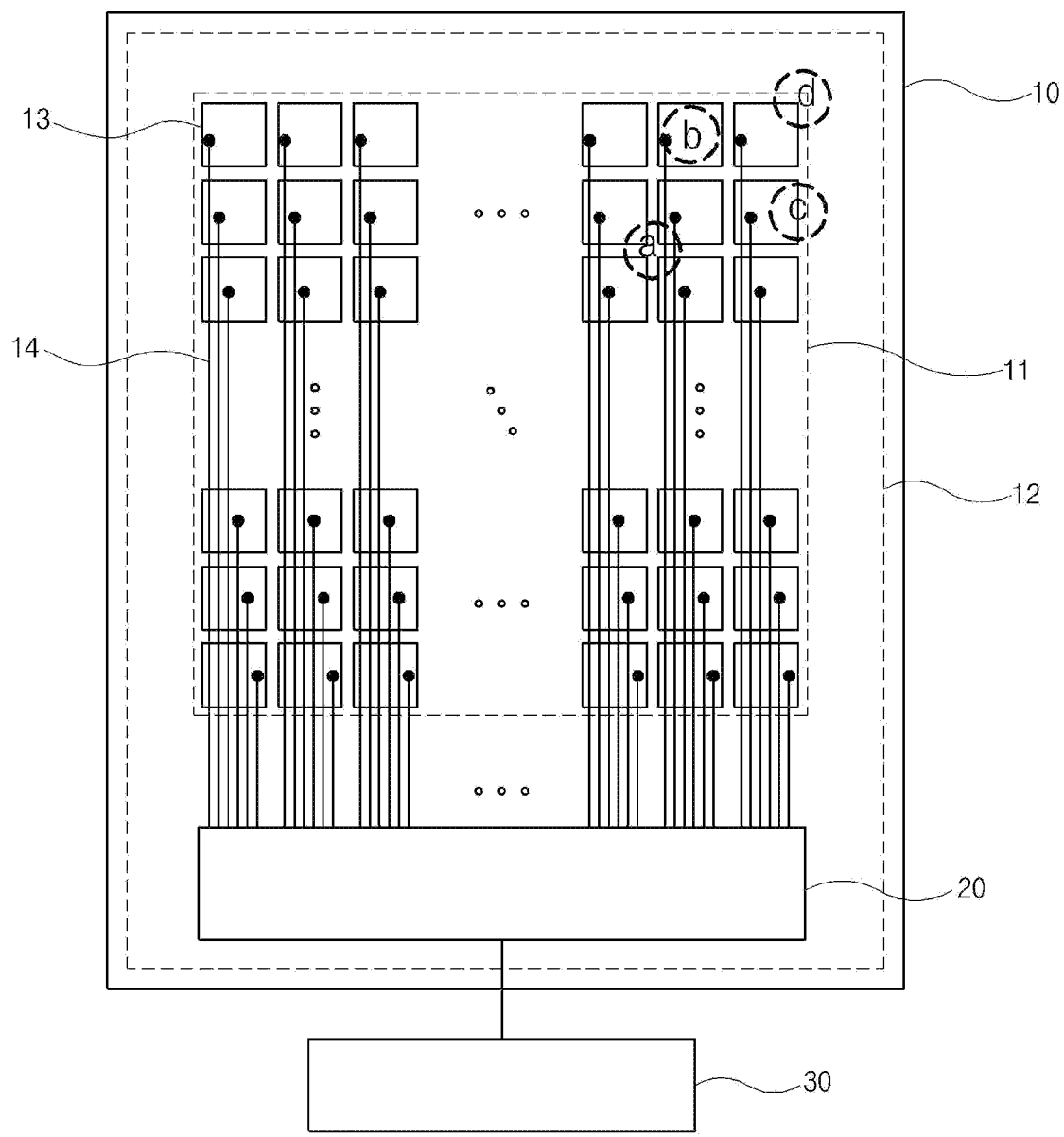
FIG. 1 is a view of a display device with a self capacitance in-cell type touch screen according to the related art.

Reference will now be made in detail to the preferred embodiments, examples of which are illustrated in the accompanying drawings.

Here, a liquid crystal display (LCD) device may be used for a panel of a display device with an in-cell type touch screen, which may be referred to as a display device with an integrated touch screen, according to the present invention, for example, and the present invention is not limited. Various flat panel display (FPD) devices such as a field emission display (FED) device, a plasma display panel (PDP) device, an electroluminescence (EL) device including an inorganic light emitting diode device or an organic light emitting diode (OLED) device, or an electrophoresis display (EPD) device may be used for the panel of the display device with an in-cell type touch screen according to the present invention. In addition, explanation for a structure of a liquid crystal display device will be simplified.

FIGS. 2 to 5 are views of illustrating a display device with an in-cell type touch screen according to an embodiment of the present invention.

As shown in the figures, the display device with an in-cell type touch screen according to the embodiment of the present invention includes a panel 100, a display driver IC 200 and a touch IC 300.

The panel 100 includes a display area 110 and a non-display area 120. A touch screen (not shown) is integrated with the panel 100 in the display area 110, and the display driver IC 200 is integrated with the panel 100 in the non-display area 120.

Here, the touch screen is to detect a touch location of a user and is a self capacitance type touch screen in which a common electrode is divided into a plurality of parts such that the plurality of parts are used as touch electrodes, capacitance is generated between the touch electrodes and an input of the user, and a change in the capacitance due to the touch of the user is measured to detect the touch.

The panel 100 may include two substrates and a liquid crystal layer interposed between the substrates. Here, although not shown in the figures, a plurality of gate lines, a plurality of data lines crossing the gate lines, a plurality of thin film transistors (TFTs) formed at crossing portions of the gate lines and the data lines, and a plurality of pixel electrodes connected to the TFTs are formed on the lower substrate of the panel 100. A plurality of pixels defined by crossing of the gate lines and the data lines are arranged on the lower substrate of the panel 100 in a matrix shape.

The panel 100 includes m driving electrodes 111 (m is a natural number) in the display area 110. The m driving electrodes 111 function as a common electrode for moving liquid crystal molecules with a pixel electrode formed in each pixel during a display driving period and acts as a touch electrode for detecting a touch location by a touch scan signal applied from the touch IC 300 during a touch driving period.

The panel 100 further includes dummy electrodes 121 in the non-display area 120. The dummy electrodes 121 are formed in the non-display area 120 adjacent to the driving electrodes 111 in a peripheral region of the display area 110.

The dummy electrodes 121 improve touch-sensing ability of the driving electrodes 111 disposed in the peripheral region of the display area 110.

Here, the peripheral region of the display area 110 is a region next to a boundary between the display area 110 and the non-display area 120 of the panel 100, and the driving electrodes 111 disposed in the peripheral region of the display area 110 are electrodes adjacent to the boundary between the display area 110 and the non-display area 120.

Figure 2:
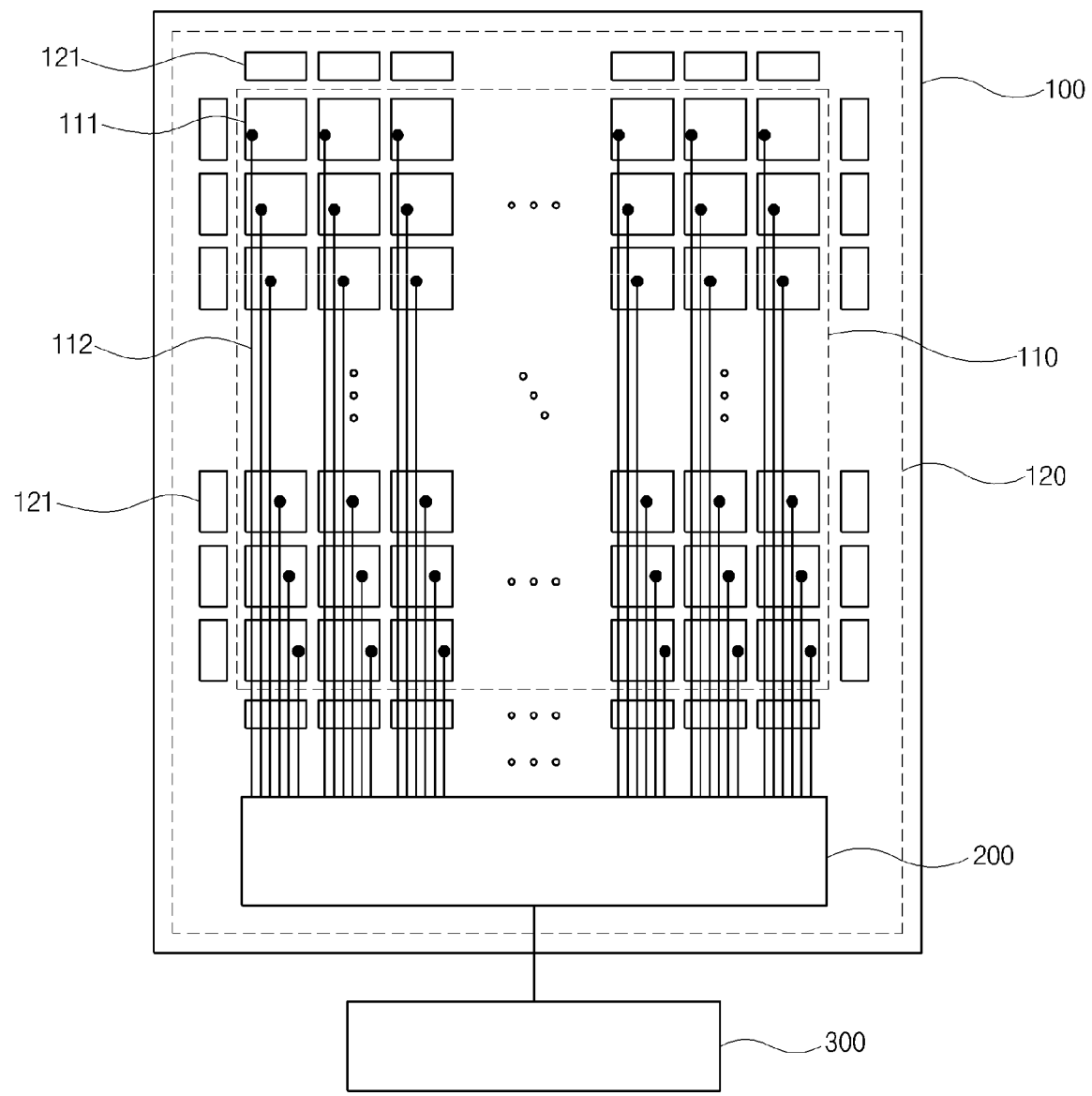
FIGS. 2 to 5 are views of illustrating a display device with an in-cell type touch screen according to an embodiment of the present invention.

As shown in FIG. 2, the dummy electrodes 121 may be smaller than the driving electrodes 111. Alternatively, the dummy electrodes 121 may have the same size as the driving electrodes 111. Here, the number of driving electrodes 111 arranged along a side of the display area 110 may be equal to the number of dummy electrodes 121 that are adjacent to the side of the display area 110 and symmetrical to the driving electrodes 111 arranged along the side of the display area 110.

Figure 3:
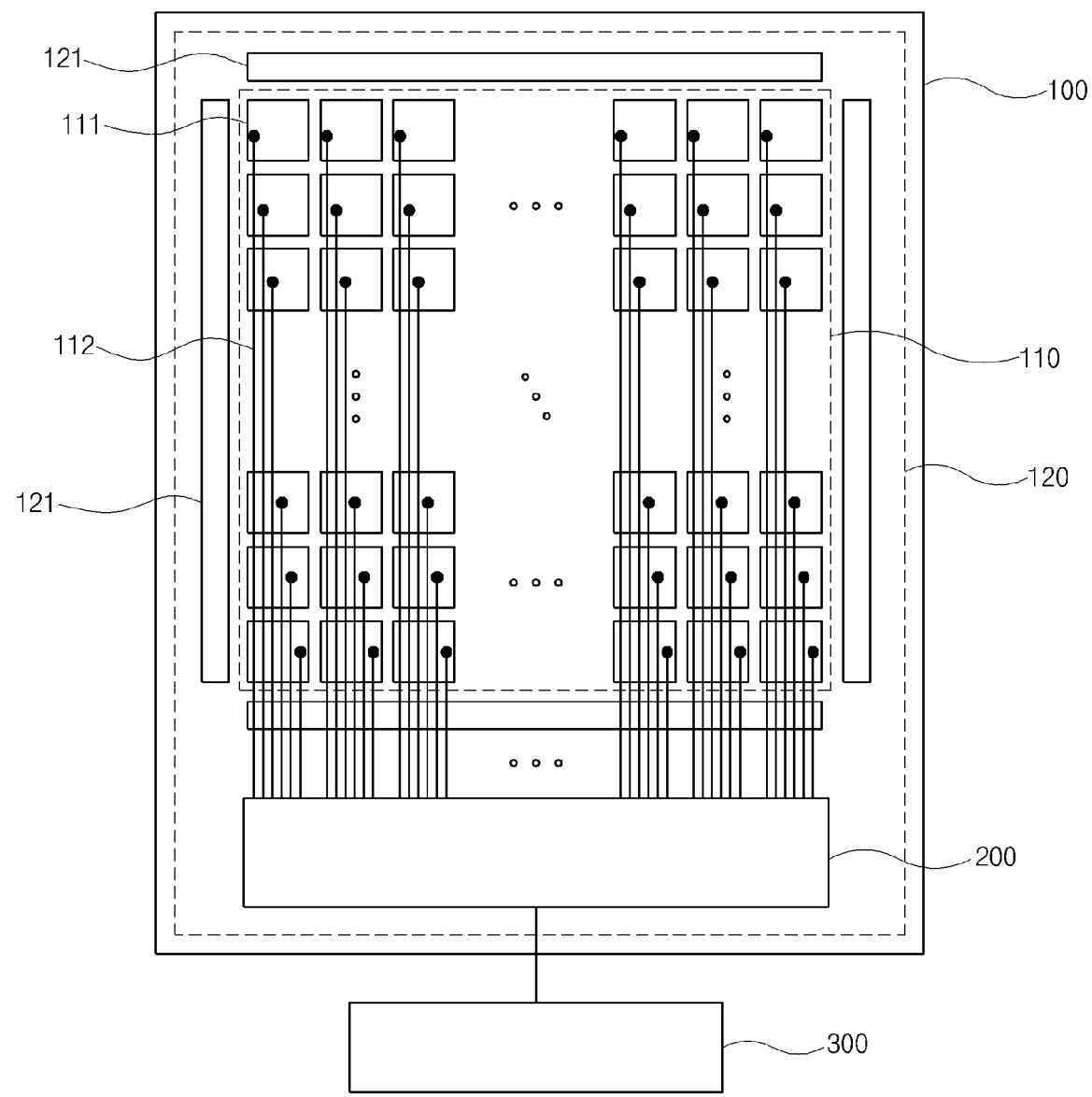

As shown in FIG. 3, the dummy electrodes 121 of another example may be larger than the driving electrodes 111 and may be bar-shaped. More particularly, the dummy electrodes 121 may have a bar shape and may be four. Four dummy electrodes 121 may surround and correspond to four sides of the display area 110.

However, at least one dummy electrode 121 may have a bar shape and may surround at least one side of the display area 110, or a plurality of bar-shaped dummy electrodes may surround at least one side of the display area 110.

The dummy electrodes 121 will be described in detail later.

The panel 100 according to the embodiment of the present invention includes m signal lines 112, and the m signal lines 112 connect the m driving electrodes 111 with the display driver IC 200, respectively. The panel 100 further includes at least one auxiliary line 122, and the at least one auxiliary line 122 connects at least one dummy electrode 121 with the display driver IC 200. However, in general, a plurality of auxiliary lines 122 connects a plurality of dummy electrodes 121 with the display driver IC 200, respectively.

For example, as shown in FIGS. 2 and 3, the m signal lines 112 connect the m driving electrodes and the display driver IC 200 such that a common voltage and a touch scan signal outputted from the display driver IC 200 are applied to the m driving electrodes 111 through the m signal lines 112. In addition, the m signal lines 112 provide the display driver IC 200 with touch sensing signals received from the m driving electrodes 111 according to the touch scan signal.

Figure 4:
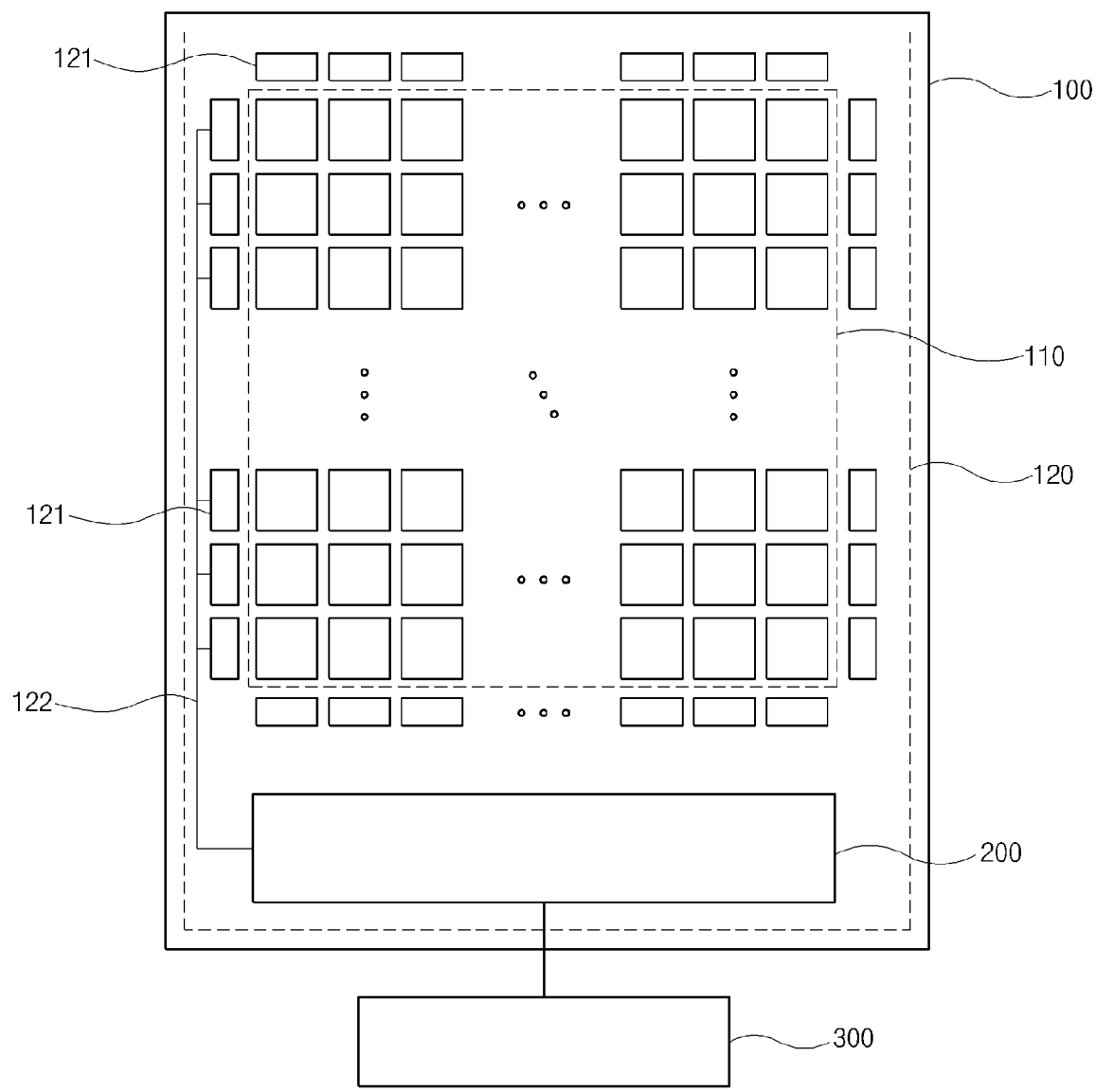
Figure 5:
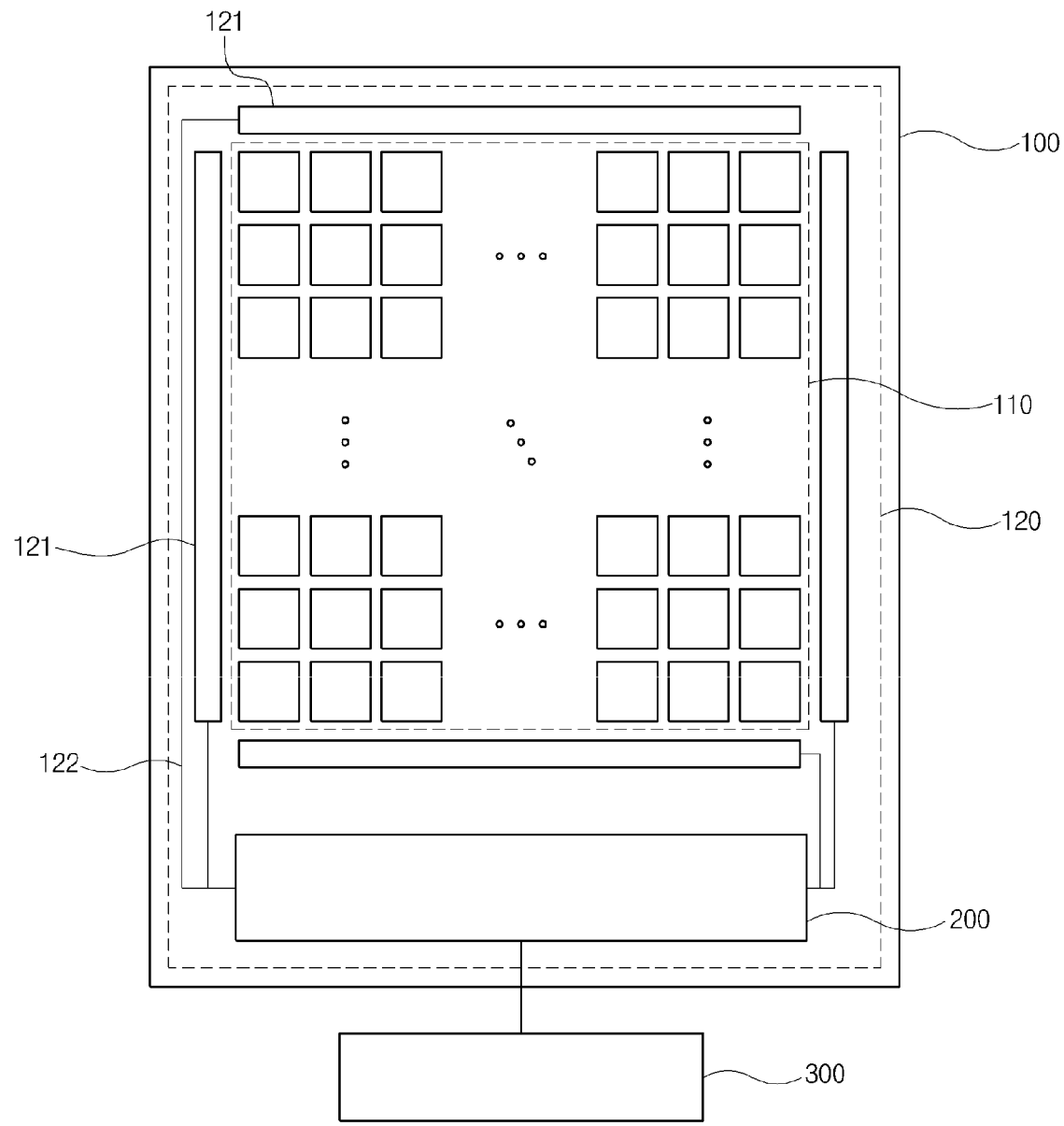

Moreover, as shown in FIGS. 4 and 5, the auxiliary lines 122 connect the dummy electrodes 121 and the display driver IC 200 such that the touch scan signal outputted from the display driver IC 200 is applied to the dummy electrodes 121 through the auxiliary lines 122. Additionally, the auxiliary lines 122 provide the display driver IC 200 with the touch sensing signals received from the dummy electrodes 121 according to the touch scan signal.

The signals received from the dummy electrodes 121 are used to perform algorithm calculation and to detect coordinates of a touch input, and the coordinates of the touch input on the dummy electrodes 121, on which the touch sensing signals are relatively less, are arbitrarily deleted after the calculation.

The touch scan signal is generated by the touch IC 300 and is applied to the m driving electrodes 111 and the dummy electrodes 121 through the display driver IC 200. The touch sensing signals are generated between the touch input of the user and the m driving electrodes 111 or between the touch input of the user and the dummy electrodes 121 according to the touch scan signal and are provided to the touch IC 300 through the display driver IC 200. The touch scan signal and the touch sensing signals will be described in detail with the touch IC 300.

Next, the display driver IC 200 applies the common voltage or the touch scan signal to the m driving electrodes 111 through the m signal lines 112 depending on driving modes of the panel 100. The display driver IC 200 also applies the touch scan signal to the dummy electrodes 121 through the auxiliary lines 122.

More particularly, in a display driving mode of the panel 100, the display driver IC 200 applies the common voltage to the m driving electrodes 111 through the m signal lines 112, and the panel 100 is driven in the display driving mode. In a touch driving mode of the panel 100, the display driver IC 200 applies the touch scan signal to the m driving electrodes 111 through the m signal lines 112 and to the dummy electrodes 121 through the auxiliary lines 122, and the panel 100 is driven in the touch driving mode.

Here, in the display driving mode, the display driver IC 200 may apply the common voltage to the dummy electrodes 121 through the auxiliary lines 122. At this time, the common voltage applied to the dummy electrodes 121 may be used to drive the panel in the display driving mode or may be used for other purposes.

As shown in the figures, the display driver IC 200 may include a common voltage generation unit, a synchronizing signal generation unit and a switching unit.

The common voltage generation unit generates the common voltage (Vcom) and applies the common voltages to the switching unit. That is, in the display driving mode of the panel 100, the common voltage generation unit generates the common voltage to be provided to the m driving electrodes for outputting an image and applies the common voltage to the switching unit.

The synchronizing signal generation unit generates synchronizing signals instructing the panel 100 to be driven in the display driving mode or the touch driving mode.

For example, the synchronizing signal generation unit generates a synchronizing signal instructing the common voltage Vcom generated by the common voltage generation unit to be applied to the m driving electrodes 111 through the switching unit according to the display driving mode or a synchronizing signal instructing the touch scan signal generated by the touch IC 300 to be applied to the m driving electrodes 111 according to the touch driving mode. Here, the touch scan signal generated by the touch IC 300 may be applied to the dummy electrodes 121 in addition to the m driving electrodes 111 by the synchronizing signal.

The switching unit connects the common voltage generation unit and the m driving electrodes 111 or connects the touch IC 300 and the m driving electrodes 111 according to the synchronizing signals. In addition, the switching unit may connect the touch IC 300 and the dummy electrodes 121, or the touch IC 300 and the dummy electrodes 121 may be connected to each other through other elements.

For example, when the synchronizing signal of the synchronizing signal generation unit instructs the panel 100 to be driven in the display driving mode, the switching unit connects the common voltage generation unit and the m driving electrodes 111, and when the synchronizing signal of the synchronizing signal generation unit instructs the panel 100 to be driven in the touch driving mode, the switching unit connects the touch IC 300 with the m driving electrodes and the dummy electrodes.

The display driver IC 200 may further include a multiplexer such that the m driving electrodes 111 are divided into groups and the touch scan signal is applied to the divided groups.

The display driver IC 200 may divide the m driving electrodes 111 of the panel 100 into a plurality of groups and may apply the touch scan signal to the groups in order using the multiplexer during the touch driving mode.

For instance, when the driving electrodes 111 of the panel 100 are divided into two groups, the display driver IC 200 may apply the common voltage to all the driving electrodes 111 of the panel 100 during the display driving mode and may apply the touch scan signal to the driving electrodes 111 of a first group and the driving electrodes 111 of a second group in order during the touch driving mode.

The touch IC 300 generates the touch scan signal and applies the touch scan signal to the m driving electrodes 111 through the display driver IC 200. Then, the touch IC 300 receives the touch sensing signals according to the touch scan signal and detects the location of the touch input on the panel 100.

For example, the touch IC 300 according to the embodiment of the present invention may include a touch scan signal generation unit (not show) generating the touch scan signal that is provided to the m driving electrodes 111 of the panel 100 to detect the touch. The touch scan signal may be a touch driving voltage, and the touch driving voltage may have a higher voltage value than the common voltage provided to the m driving electrodes 111 of the panel 100 during the display driving mode. Here, the touch driving voltage may have the same voltage value as the common voltage as a low level voltage value and the higher voltage value than the common voltage as a high level voltage value.

The touch scan signal generation unit is connected to the m driving electrodes 111 through the switching unit of the display driver IC 200.

The touch IC 300 may include a touch sensing unit (not shown) that senses a change in capacitance generated between the touch input of the user and the driving electrodes 111 according to the touch scan signal and detects the location of the touch input of the user. The sensed change in capacitance, that is, the touch sensing signals are supplied to a system unit (not shown) of the display device, and a touch coordinate of the user on the panel 100 is displayed in the display area 110 of the panel 100.

The touch sensing unit is connected to the m driving electrodes 111 through the switching unit of the display driver IC 200.

The touch IC 300 generates the touch scan signal and applies the touch scan signal to the dummy electrodes 121 through the display driver IC 200. The touch IC 300 receives the touch sensing signals according to the touch scan signal and improves the touch-sensing ability of the driving electrodes 111 formed in the peripheral region of the display area 110. In this case, the touch scan signal generation unit and the touch sensing unit of the touch IC 300 may be connected to the dummy electrodes 121 through the switching unit of the display driver IC 200.

Hereinafter, the driving electrodes 111, the dummy electrodes 121 and the technical solutions to be solved in the present invention will be described in detail.

As stated above, the panel 100 according to the embodiment of the present invention includes the dummy electrode 121 in the non-display area 120. Particularly, the dummy electrodes 121 are disposed in the non-display area 120 adjacent to the driving electrodes 111 in the peripheral region of the display area 110.

Here, the peripheral region of the display area 110 is a region next to the boundary between the display area 110 and the non-display area 120 of the panel 100, and the driving electrodes 111 disposed in the peripheral region of the display area 110 are electrodes adjacent to the boundary between the display area 110 and the non-display area 120.

The dummy electrodes 121, as shown in FIG. 2, may be smaller than the driving electrodes 111. Alternatively, the dummy electrodes 121 may have the same size as the driving electrodes 111. The dummy electrodes 121, as shown in FIG. 3, may be larger than the driving electrodes 111.

In the present invention, since the dummy electrodes 121 are formed in the non-display area 120 adjacent to the driving electrodes 111 in the peripheral region of the display area 110, even though the touch input of the user is applied to the peripheral region of the display area 110, the touch sensitivity and the touch ability are increased to the extent of the touch sensitivity and the touch ability when the touch input of the user is applied to the inner region of the display area 110.

For example, when the touch input of the user is applied to the peripheral region of the display area 110, the touch input of the user can be received in the non-display area 120 as well as in the peripheral region of the display area 110 because the dummy electrodes 121 are formed in the non-display area 120 adjacent to the driving electrodes 111 in the peripheral region.

Accordingly, the touch input of the user is also received in the non-display area 120 adjacent to the peripheral region, and the touch sensitivity and the touch ability are improved as compared with the related art.

The amount of the touch sensing signals is proportional to an area of the electrodes contacting the touch input of the user, and the amount of the touch sensing signals is increased if the touch input of the user is also received in the non-display area adjacent to the peripheral region. Therefore, the touch sensitivity and ability are increased.

Moreover, the capacitance between the electrode corresponding to the touch input and the electrode adjacent thereto is increased due to the dummy electrodes 121 in the non-display area 120, and the amount of the touch sensing signals is further increased. The touch sensitivity and the touch ability are further improved.

As mentioned above, when the touch input is applied to the driving electrodes 111 in the peripheral region of the display area 120, the algorithm calculation including the signals received from the dummy electrodes 121 in the non-display area 120 is performed to detect coordinates of the touch input. The coordinates of the touch input on the dummy electrodes 121, on which the touch sensing signals are relatively less, are arbitrarily deleted after the calculation, and the other coordinates are displayed in the display area 110.

A display device with an in-cell type touch screen according to another embodiment of the present invention will be described hereinafter in detail with reference to FIGS. 6 and 7.

Figure 6:
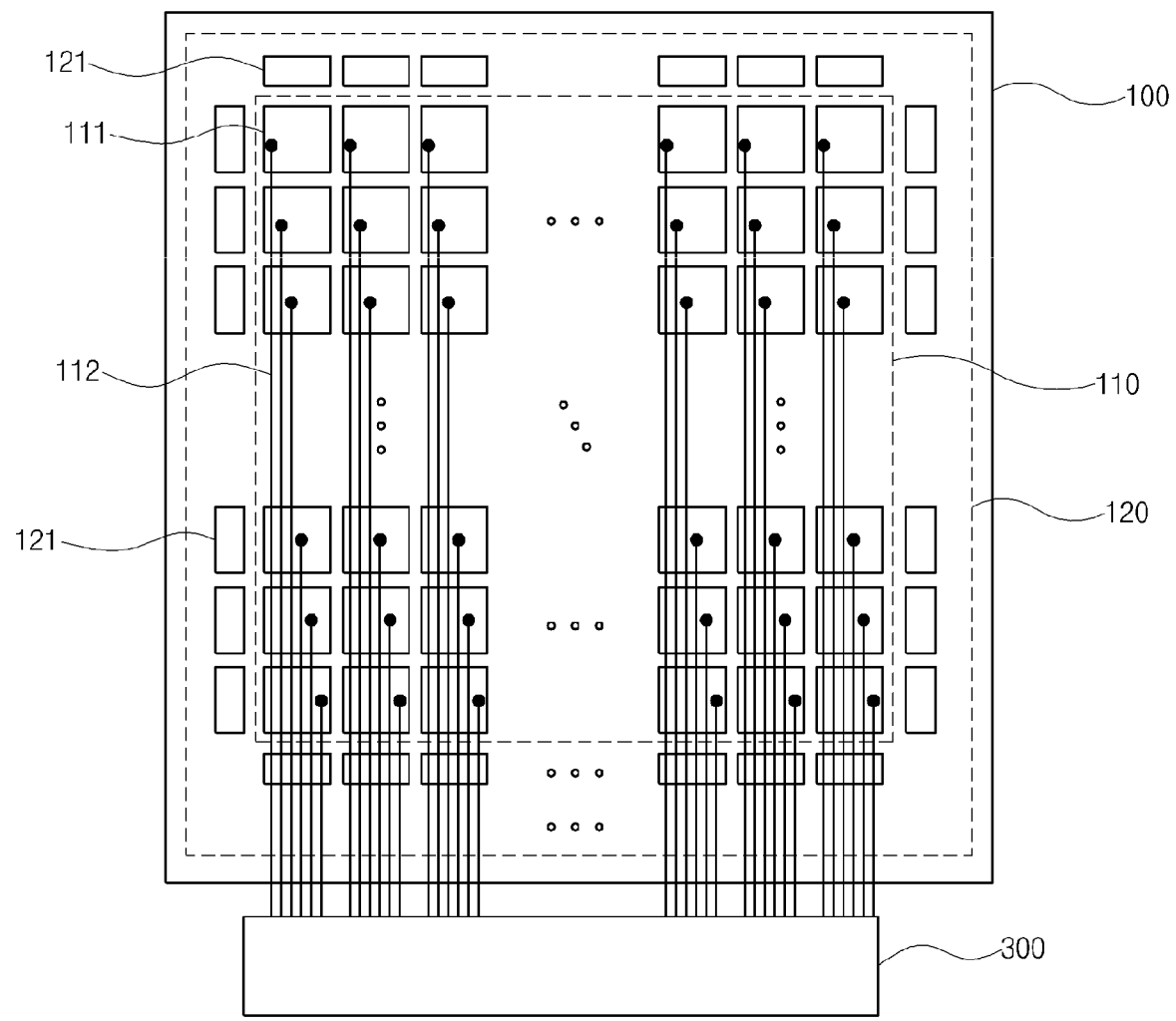
FIGS. 6 and 7 are views of illustrating a display device with an in-cell type touch screen according to another embodiment of the present invention.
Figure 7:
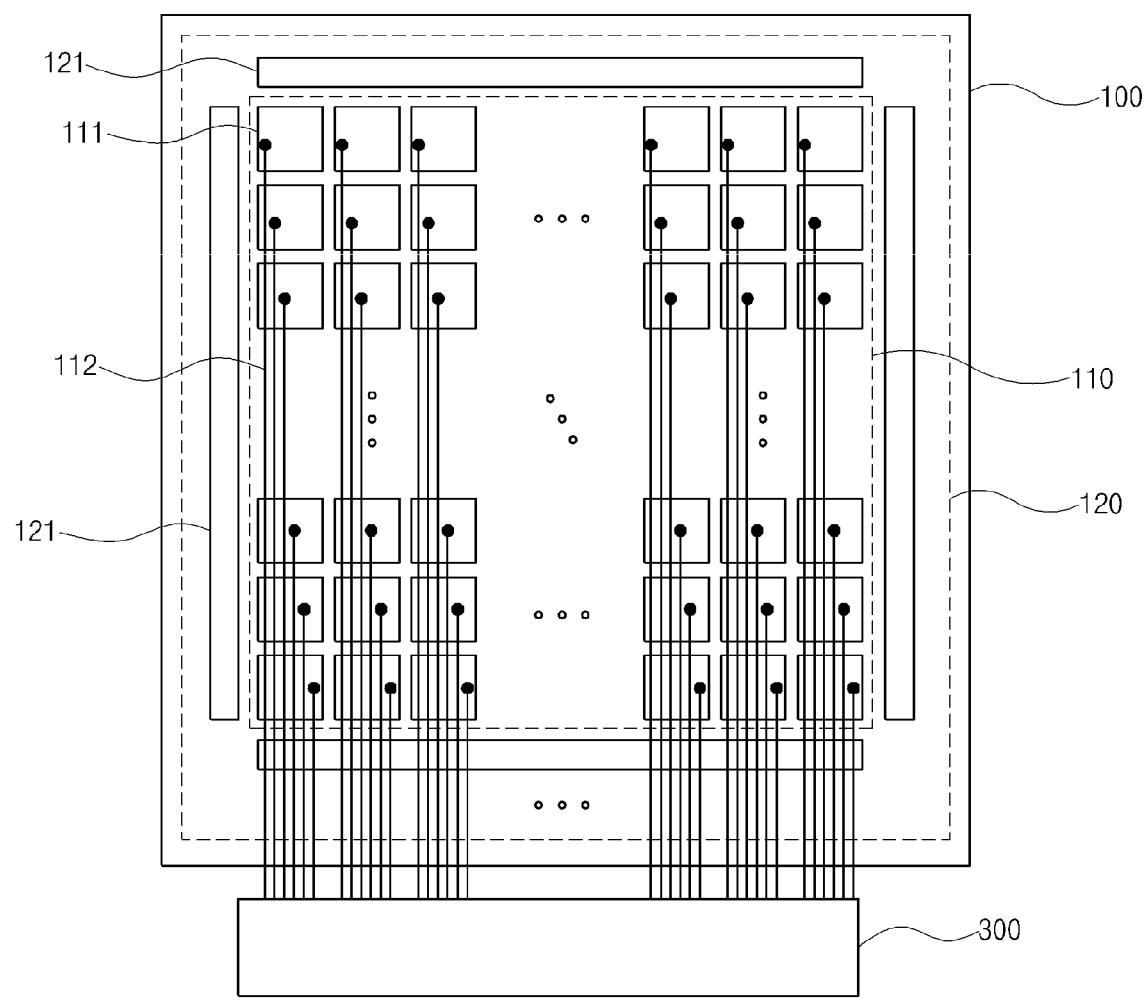

FIGS. 6 and 7 are views of illustrating a display device with an in-cell type touch screen according to another embodiment of the present invention.

As shown in FIGS. 6 and 7, the display device with an in-cell type touch screen according to another embodiment of the present invention includes a panel 100 and a touch IC 300.

The panel 100 includes a display area 110 and a non-display area 120. A touch screen (not shown) is integrated with the panel 100 in the display area 110. Although not shown in the figures, the touch IC 300 may be integrated with the panel 100 in the non-display area 120.

Here, the touch screen is to detect a touch location of a user and is a self capacitance type touch screen in which a common electrode is divided into a plurality of parts such that the plurality of parts are used as touch electrodes, capacitance is generated between the touch electrodes and an input of the user, and a change in the capacitance due to the touch of the user is measured to detect the touch.

The panel 100 may include two substrates and a liquid crystal layer interposed between the substrates. Here, although not shown in the figures, a plurality of gate lines, a plurality of data lines crossing the gate lines, a plurality of thin film transistors (TFTs) formed at crossing portions of the gate lines and the data lines, and a plurality of pixel electrodes connected to the TFTs are formed on the lower substrate of the panel 100. A plurality of pixels defined by crossing of the gate lines and the data lines are arranged on the lower substrate of the panel 100 in a matrix shape.

The panel 100 includes m driving electrodes 111 (m is a natural number) in the display area 110. The m driving electrodes 111 function as a common electrode for moving liquid crystal molecules with a pixel electrode formed in each pixel during a display driving period and acts as a touch electrode for detecting a touch location by a touch scan signal applied from the touch IC 300 during a touch driving period.

The panel 100 further includes dummy electrodes 121 in the non-display area 120. The dummy electrodes 121 are formed in the non-display area 120 adjacent to the driving electrodes 111 in a peripheral region of the display area 110.

The dummy electrodes 121 improve touch-sensing ability of the driving electrodes 111 disposed in the peripheral region of the display area 110.

Here, the peripheral region of the display area 110 is a region next to a boundary between the display area 110 and the non-display area 120 of the panel 100, and the driving electrodes 111 disposed in the peripheral region of the display area 110 are electrodes adjacent to the boundary between the display area 110 and the non-display area 120.

As shown in FIG. 6, the dummy electrodes 121 may be smaller than the driving electrodes 111. Alternatively, the dummy electrodes 121 may have the same size as the driving electrodes 111. Here, the number of driving electrodes 111 arranged along a side of the display area 110 may be equal to the number of dummy electrodes 121 that are adjacent to the side of the display area 110 and symmetrical to the driving electrodes 111 arranged along the side of the display area 110.

As shown in FIG. 7, the dummy electrodes 121 of another example may be larger than the driving electrodes 111 and may be bar-shaped. More particularly, the dummy electrodes 121 may have a bar shape and may be four. Four dummy electrodes 121 may surround and correspond to four sides of the display area 110.

However, at least one dummy electrode 121 may have a bar shape and may surround and correspond to at least one side of the display area 110, or a plurality of bar-shaped dummy electrodes may surround and correspond to at least one side of the display area 110.

The dummy electrodes 121 will be described in detail later.

The panel 100 according to another embodiment of the present invention includes m signal lines 112, and the m signal lines 112 connect the m driving electrodes 111 with the touch IC 300, respectively. The panel 100 further includes at least one auxiliary line 122, and the at least one auxiliary line 122 connects at least one dummy electrode 121 with the touch IC 300. However, in general, a plurality of auxiliary lines 122 connects a plurality of dummy electrodes 121 with the touch IC 300, respectively.

For example, as shown in FIG. 6, the m signal lines 112 connect the m driving electrodes and the touch IC 300 such that a common voltage and a touch scan signal outputted from the touch IC 300 are applied to the m driving electrodes 111 through the m signal lines 112. In addition, the m signal lines 112 provide the touch IC 300 with touch sensing signals received from the m driving electrodes 111 according to the touch scan signal.

Moreover, as shown in FIG. 7, the auxiliary lines 122 connect the dummy electrodes 121 and the touch IC 300 such that the touch scan signal outputted from the touch IC 300 is applied to the dummy electrodes 121 through the auxiliary lines 122. Additionally, the auxiliary lines 122 provide the touch IC 300 with the touch sensing signals received from the dummy electrodes 121 according to the touch scan signal.

The signals received from the dummy electrodes 121 are used to perform algorithm calculation and to detect coordinates of a touch input, and the coordinates of the touch input on the dummy electrodes 121, on which the touch sensing signals are relatively less, are arbitrarily deleted after the calculation.

The touch scan signal is generated by the touch IC 300 and is applied to the m driving electrodes 111 and the dummy electrodes 121. The touch sensing signals are generated between the touch input of the user and the m driving electrodes 111 or between the touch input of the user and the dummy electrodes 121 according to the touch scan signal and are provided to the touch IC 300. The touch scan signal and the touch sensing signals will be described in detail with the touch IC 300.

Next, the touch IC 300 applies the touch scan signal to the m driving electrodes 111 through the m signal lines 112. Then, the touch IC 300 receives the touch sensing signals according to the touch scan signal and detects the location of the touch input on the panel 100.

For example, the touch IC 300 according to the embodiment of the present invention may include a touch scan signal generation unit (not show) generating the touch scan signal that is provided to the m driving electrodes 111 of the panel 100 to detect the touch. The touch scan signal may be a touch driving voltage, and the touch driving voltage may have a higher voltage value than the common voltage provided to the m driving electrodes 111 of the panel 100 during a display driving mode. Here, the touch driving voltage may have the same voltage value as the common voltage as a low level voltage value and the higher voltage value than the common voltage as a high level voltage value.

Moreover, the touch IC 300 may include a touch sensing unit (not shown) that senses a change in capacitance generated between the touch input of the user and the driving electrodes 111 according to the touch scan signal and detects the location of the touch input of the user. The sensed change in capacitance, that is, the touch sensing signals are supplied to a system unit (not shown) of the display device, and a touch coordinate of the user on the panel 100 is displayed in the display area 110 of the panel 100.

The touch IC 300 according to another embodiment of the present invention may be connected to the m driving electrodes 111 through a multiplexer (not shown). The multiplexer may be formed in the non-display area 120 of the panel 100. The m driving electrodes 111 may be divided into groups, and the multiplexer may apply the touch scan signal to the divided groups and transfer the touch sensing signals received from the m driving electrodes 111 of each group to the touch sensing unit.

For instance, when the driving electrodes 111 of the panel 100 are divided into two groups, the touch IC 300 may apply the touch scan signal to the driving electrodes 111 of a first group and the driving electrodes 111 of a second group in order through the multiplexer and receive the touch sensing signals according to the touch scan signal through the multiplexer.

The touch IC 300 generates the touch scan signal and applies the touch scan signal to the dummy electrodes 121. The touch IC 300 receives the touch sensing signals according to the touch scan signal and improves the touch-sensing ability of the driving electrodes 111 formed in the peripheral region of the display area 110. In this case, the touch scan signal generation unit and the touch sensing unit of the touch IC 300 may be connected to the dummy electrodes 121 through the multiplexer.

Hereinafter, the driving electrodes 111, the dummy electrodes 121 and the technical solutions to be solved in the present invention will be described in detail.

As stated above, the panel 100 according to another embodiment of the present invention includes the dummy electrode 121 in the non-display area 120. Particularly, the dummy electrodes 121 are disposed in the non-display area 120 adjacent to the driving electrodes 111 in the peripheral region of the display area 110.

Here, the peripheral region of the display area 110 is a region next to the boundary between the display area 110 and the non-display area 120 of the panel 100, and the driving electrodes 111 disposed in the peripheral region of the display area 110 are electrodes adjacent to the boundary between the display area 110 and the non-display area 120.

The dummy electrodes 121, as shown in FIG. 6, may be smaller than the driving electrodes 111. Alternatively, the dummy electrodes 121 may have the same size as the driving electrodes 111. The dummy electrodes 121, as shown in FIG. 7, may be larger than the driving electrodes 111.

In the present invention, since the dummy electrodes 121 are formed in the non-display area 120 adjacent to the driving electrodes 111 in the peripheral region of the display area 110, even though the touch input of the user is applied to the peripheral region of the display area 110, the touch sensitivity and the touch ability are increased to the extent of the touch sensitivity and the touch ability when the touch input of the user is applied to the inner region of the display area 110.

For example, when the touch input of the user is applied to the peripheral region of the display area 110, the touch input of the user can be received in the non-display area 120 as well as in the peripheral region of the display area 110 because the dummy electrodes 121 are formed in the non-display area 120 adjacent to the driving electrodes 111 in the peripheral region.

Accordingly, the touch input of the user is also received in the non-display area 120 adjacent to the peripheral region, and the touch sensitivity and the touch ability are improved as compared with the related art.

The amount of the touch sensing signals is proportional to an area of the electrodes contacting the touch input of the user, and the amount of the touch sensing signals is increased if the touch input of the user is also received in the non-display area adjacent to the peripheral region. Therefore, the touch sensitivity and ability are increased.

Moreover, the capacitance between the electrode corresponding to the touch input and the electrode adjacent thereto is increased due to the dummy electrodes 121 in the non-display area 120, and the amount of the touch sensing signals is further increased. The touch sensitivity and the touch ability are further improved.

As mentioned above, when the touch input is applied to the driving electrodes 111 in the peripheral region of the display area 120, the algorithm calculation including the signals received from the dummy electrodes 121 in the non-display area 120 is performed to detect coordinates of the touch input. The coordinates of the touch input on the dummy electrodes 121, on which the touch sensing signals are relatively less, are arbitrarily deleted after the calculation, and the other coordinates are displayed in the display area 110.

In the display device with an in-cell type touch screen according to the embodiments of the present invention, the electrodes are also formed in the non-display area, and the touch ability in the peripheral region of the display area is improved.

It will be apparent to those skilled in the art that various modifications and variations can be made in a display device of the present disclosure without departing from the sprit or scope of the invention. Thus, it is intended that the present invention covers the modifications and variations of this invention provided they come within the scope of the appended claims and their equivalents.

What is claimed is:

1. A display device with an integrated touch screen, comprising:
    a panel divided into a display area and a non-display area and including m (m is a natural number) driving electrodes, m signal lines, a plurality of dummy electrodes, and a plurality of auxiliary lines, each of the dummy electrodes being connected to one of the auxiliary lines;
    a display driver IC applying a common voltage or a touch scan signal to the m driving electrodes through the m signal lines; and
    a touch IC generating the touch scan signal and providing the touch scan signal to the display driver IC,
    wherein the m driving electrodes are disposed in the display area and the dummy electrodes are disposed in the non-display area, and wherein the dummy electrodes are adjacent to the driving electrodes in a peripheral region of the display area;
    wherein, when the panel is driven in a touch driving mode, the display driver IC applies the touch scan signal to the m driving electrodes through the m signal lines and to the dummy electrodes through the auxiliary lines, and the touch IC receives touch sensing signals according to the touch scan signal from the m driving electrodes through the m signal lines and from the dummy electrodes through the auxiliary lines; and
    wherein each of the dummy electrodes is connected to the display driver IC through a corresponding one of the auxiliary lines.

2. The device according to claim 1, wherein the number of the driving electrodes arranged along each side of the display area is equal to the number of the dummy electrodes that are adjacent to the side of the display area and symmetrical to the driving electrodes arranged along the side of the display area.

3. The device according to claim 1, wherein at least one of the dummy electrodes has a bar shape.

4. The device according to claim 1, where there are four dummy electrodes which are bar-shaped.

5. The device according to claim 1, wherein the display driver IC includes a multiplexer such that the m driving electrodes are divided into groups and the touch scan signal is applied to the divided groups.

6. The device according to claim 1, wherein the touch IC includes:
    a touch scan signal generation unit generating the touch scan signal; and
    a touch sensing unit receiving touch sensing signals according to the touch scan signal from the m driving electrodes and detecting a location of a touch input on the panel.

7. The device according to claim 1, wherein the display driver IC applies the common voltage to the m driving electrodes through the m signal lines when the panel is driven in a display driving mode.

8. The device according to claim 7, wherein the display driver IC includes:

a common voltage generation unit generating the common voltage;

a synchronizing signal generation unit generating synchronizing signals instructing the panel to be driven in the display driving mode or the touch driving mode; and a switching unit connecting the common voltage generation unit and the m driving electrodes or connecting the touch IC and the m driving electrodes depending on the synchronizing signals.

9. A display device with an integrated touch screen, comprising:

a panel divided into a display area and a non-display area and including m (m is a natural number) driving electrodes, m signal lines, a plurality of dummy electrodes, and a plurality of auxiliary lines, each of the dummy electrodes being connected to one of the auxiliary lines;

a display driver IC applying a common voltage or a touch scan signal to the m driving electrodes through the m signal lines; and a touch IC generating the touch scan signal and providing the touch scan signal to the display driver IC, wherein the m driving electrodes are disposed in the display area and the dummy electrodes are disposed in the non-display area, and wherein the dummy electrodes are adjacent to the driving electrodes in a peripheral region of the display area;

wherein each one of the plurality of dummy electrodes is physically disconnected from every other dummy electrode;

wherein, when the panel is driven in a touch driving mode, the display driver IC applies the touch scan signal to the m driving electrodes through the m signal lines and to the dummy electrodes through the auxiliary lines, and the touch IC receives touch sensing signals according to the touch scan signal from the m driving electrodes through the m signal lines and from the dummy electrodes through the auxiliary lines; and wherein each of the dummy electrodes is connected to the display driver IC through a corresponding one of the auxiliary lines.

10. The device according to claim 9, wherein the number of the driving electrodes arranged along each side of the display area is equal to the number of the dummy electrodes that are adjacent to the side of the display area and symmetrical to the driving electrodes arranged along the side of the display area.

11. The device according to claim 9, wherein at least one of the dummy electrodes has a bar shape.

12. The device according to claim 9, where there are four dummy electrodes which are bar-shaped.

13. The device according to claim 9, wherein the panel includes a multiplexer such that the m driving electrodes are divided into groups and the touch scan signal is applied to the divided groups.

14. The device according to claim 9, wherein the touch IC includes:

a touch scan signal generation unit generating the touch scan signal; and a touch sensing unit receiving the touch sensing signals according to the touch scan signal from the m driving electrodes to detect the location of the touch input on the panel.

15. The device according to claim 9, wherein the touch IC is integrated into the non-display area of the panel.

16. A display device with an integrated touch screen, comprising:

a panel divided into a display area and a non-display area and including m (m is a natural number) driving electrodes, m signal lines, and a plurality of dummy electrodes, and a plurality of auxiliary lines, each of the dummy electrodes being connected to one of the auxiliary lines;

a display driver IC applying a common voltage or a touch scan signal to the m driving electrodes through the m signal lines; and a touch IC generating the touch scan signal and providing the touch scan signal to the display driver IC, wherein the m driving electrodes are disposed in the display area and the dummy electrodes are disposed only in the non-display area, and wherein the dummy electrodes are adjacent to the driving electrodes in a peripheral region of the display area to surround four sides of the display area;

wherein the number of the driving electrodes arranged along each of the four sides of the display area is equal to the number of the dummy electrodes that are adjacent to the four sides of the display area;

wherein, when the panel is driven in a touch driving mode, the display driver IC applies the touch scan signal to the m driving electrodes through the m signal lines and to the dummy electrodes through the auxiliary lines, and the touch IC receives touch sensing signals according to the touch scan signal from the m driving electrodes through the m signal lines and from the dummy electrodes through the auxiliary lines; and wherein each of the dummy electrodes is connected to the display driver IC through a corresponding one of the auxiliary lines.

* * * * *